United States Patent [19]
Lobur

[11] 3,721,795
[45] March 20, 1973

[54] SERVOMECHANISM FEED SYSTEM

[75] Inventor: Walter Lobur, Clawson, Mich.

[73] Assignee: Electronic Removal of Metals, Inc., Clawson, Mich.

[22] Filed: Jan. 11, 1972

[21] Appl. No.: 217,008

[52] U.S. Cl ............................. 219/69 G, 318/611
[51] Int. Cl. ............................................... B23p 1/14
[58] Field of Search ..................... 219/69 G; 318/611

[56] References Cited

UNITED STATES PATENTS

| | | | |
|---|---|---|---|
| 2,807,706 | 9/1957 | Oezer | 219/69 G |
| 3,435,176 | 3/1969 | Lobur | 219/69 G |
| 3,435,177 | 3/1969 | Shaffer | 219/69 G |
| 3,437,781 | 4/1969 | Webb | 219/69 G |
| 3,524,961 | 8/1970 | Sennowitz | 219/69 G |
| 3,525,843 | 8/1970 | Batterson | 219/69 G |

*Primary Examiner*—R. F. Staubly
*Attorney*—Irving M. Weiner

[57] ABSTRACT

A servomechanism feed system providing delayed "triggered" backup in combination with an automatic velocity control. The system permits high velocity approach of a movable object, and retract and automatic damping of velocity for stable operation thereby relieving the operator from manual search for desired conditions. Approach means operates in response to an input signal and at low velocity stabilizes near desired conditions. Backup or retract signal is "transistor triggered" only after high velocity overshoot of the reference signal. At this time complementary transistors or other electronic control devices shunting the output become conductive to reduce the velocity and give stable operation.

10 Claims, 1 Drawing Figure

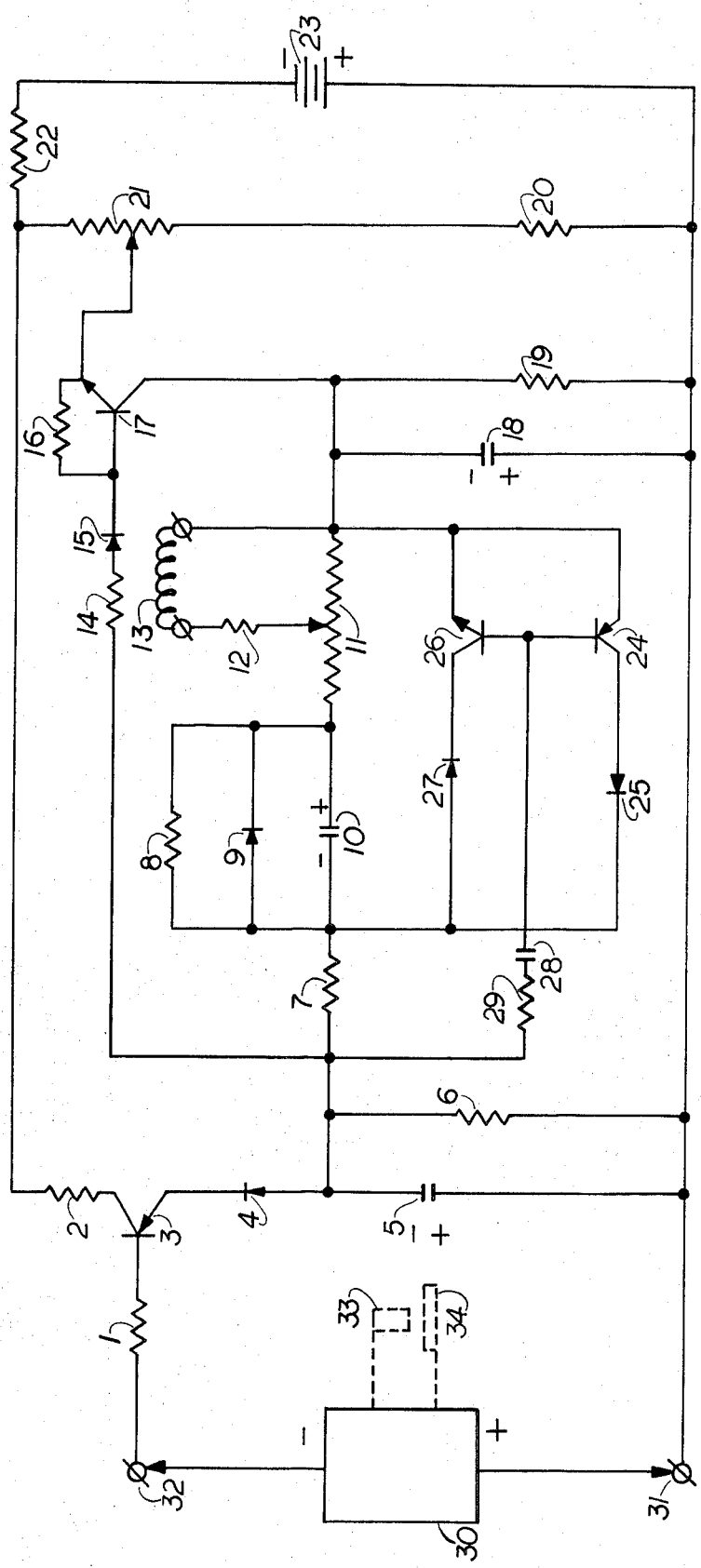

3,721,795

SERVOMECHANISM FEED SYSTEM

The present invention relates to a servomechanism feed system having delayed "triggered" back-up in combination with automatic velocity control. Although the servomechanism feed system of the present invention has general application and consequently can be used in a myriad of different environments and applications wherever it is desired to control the position, movement and/or velocity of a moving object, such as in a gun control system, the present invention will be described herein with reference to an electrical discharge machining apparatus.

BACKGROUND OF THE INVENTION

A problem encountered in servomechanism feed systems for electrical discharge machining equipment is that normal control settings for optimum cutting conditions involve a relatively low servomechanism feed velocity. This necessarily involves a relatively low approach time on initial downfeed. Moreover, in electrical discharge machining it is frequently highly desirable to have a fast approach and retract servomechanism system. However, the desired velocity is generally too high for stable operation during cutting, especially during fine finish and/or tight gap conditions.

As the operator reduces velocity to gain stability, there is a very real danger of a "feed freeze" stall due to friction, effects of temperature changes, and other factors. During deep hole fine finish working operations, the slow velocity during long back-up to clear sludge shorts can make a job prohibitive.

In conventional servomechanism circuits, the output signal is normally balanced between the input signal and a rigid voltage variable reference signal. The downfeed signal is limited to the difference in the voltages of the input signal and the reference signal, and any overshoot is generally met by a relatively violent reversing which leads to a hunt instability condition.

The present invention eliminates the undesirable conditions and disadvantages described above in connection with conventional servomechanism feed systems.

SUMMARY OF THE INVENTION

The present invention provides a servomechanism feed system including a source of electrical power, a first movable means, and input signal means operatively connected to the first movable means for providing an electrical input signal representative of a condition in the vicinity of the first movable means. Motive means are operatively connected to the first movable means for selectively moving the first movable means. An electrically energized element, such as a suitable electrohydraulic valve control coil, is operatively connected to and controls the operation of the motive means. Velocity control means is operatively connected to and controls the operation of the electrically energized element. Variable reference signal means is operatively connected between the source of electrical power and the velocity control means for providing a variable reference signal. Electrical means are operatively connected to the input signal means, to the velocity control means, and to the variable reference signal means for providing a back-up signal for said electrically energized element only after high velocity overshoot of said variable reference signal.

It is an object of the present invention to provide a servomechanism feed system which does not require a rigid reference signal, and at low velocity the system can achieve stable operation due to downfeed power "run-out."

It is a further object of the present invention to provide a servomechanism feed system wherein the reversing voltage is measured out or triggered only as required.

It is an additional object of the present invention to provide a servomechanism feed system wherein the tendency of any low velocity condition to freeze motion in the system is corrected by the automatic velocity control circuit.

The present invention provides a servomechanism feed system which utilizes "stand-by" or triggered back-up circuits permitting the electrically energized element, such as a coil, to freely downfeed without being balanced across or between two voltages, such as an input signal voltage and a reference signal voltage.

The present invention also provides a servomechanism feed system utilizing the reversing voltages across the output itself during unstable hunt conditions as the signal for velocity damping circuits. The system employs the concept of utilizing the condenser or transformer coupling of the aforementioned signal so as to be operative during transient rate of change conditions, and to be inoperative during prolonged steady state conditions.

BRIEF DESCRIPTION OF THE DRAWING

The drawing illustrates a schematic of a servomechanism feed system in accordance with the principles of the present invention used in conjunction with an electrical discharge machining system.

DETAILED DESCRIPTION OF THE INVENTION

With reference to the drawing, an input signal which is functionally related to the arc gap voltage between the tool electrode 33 and the conductive workpiece 34 is processed by the stage 30. The processed input signal is applied to input terminals 31 and 32, with input terminal 31 serving as the common zero volt reference potential. The servomechanism feed system or circuit is energized by a source of electrical power such as a filtered direct current supply represented by battery 23.

In the drawing, the direct current supply has been illustrated as a battery 23 in the interest of simplifying the drawing and the description thereof. In actual practice, this source of direct current may be derived from the secondary of a transformer having its primary connected to the power source for the electrical discharge machining apparatus which may be single phase or polyphase alternating current. The secondary voltage may be rectified and stored, usually in an electrolytic storage capacitor to form a nearly ideal direct current source having a very low internal impedance.

During a condition of downfeed operation, the voltage at input terminal 32 is applied through a first impedance, such as a current limiting resistor 1, to the control electrode of a third electronic control device. In the particular embodiment of the invention illustrated in the drawing, the third electronic control device is depicted as an emitter-follower transistor 3.

The term "electronic control device" as used herein is intended to mean any electronic switching device having three or more electrodes comprising at least two principal power electrodes acting to control current flow in the power circuit, the conductivity between the power electrodes being controlled by a control electrode within the device whereby the conductivity of the power circuit is controlled statically or electrically without the movement of mechanical elements within the device. Included within this definition are vacuum tubes, transistors, and other solid-state devices in which the turn-ON is accomplished by control voltage applied to the control electrode and in which the turn-OFF is accomplished automatically in response to the removal of that control voltage.

Reverting to the drawing, the voltage and input terminal 32 is applied through current limiting resistor 1 to the base electrode or control electrode of transistor 3 which is an emitter-follower drawing current through a second impedance, such as limiting resistor 2, to charge the condenser 5 through the blocking diode 4. The condenser 5 forms part of a first parallel resistance-capacitance network having one of its terminals connected to the input terminal 31.

The voltage developed across condenser 5 is applied through resistor 7 and then through resistor 8 and the condenser 10 to velocity control means in the form of a variable velocity control potentiometer 11. The desired or predetermined portion of the voltage across the variable velocity control potentiometer 11 is applied through a first resistor 12 to an electrically energized element, such as a hydraulic coil 13 with circuit completion through a second parallel resistance-capacitance network formed by resistor 19 and condenser 18. It should be carefully noted that in this condition no back-up voltage of signal is present.

The variable reference signal means, which is illustrated in the form of a gap control variable potentiometer 21, is energized by the direct current source of electrical power 23 through the current limiting resistor 22. The gap control variable potentiometer 21 forms a voltage divider with the minimum voltage limiting resistor 20.

When the voltage across the condenser 5 is less than the variable reference signal voltage set by the gap control variable potentiometer 21, then the fourth electronic control device or transistor 17 will become conductive because of the base voltage applied through the current limiting resistor 14 and the reverse voltage blocking diode 15. The resistor 16 is a return path to prevent a "free floating" base electrode of the transistor 17.

As the transistor 17 closes or becomes conductive, it charges the condenser 18 to the variable reference signal voltage at the emitter of transistor 17 which reference voltage is greater than the voltage across condenser 5. Consequently, this will causes a reverse current to pass through the velocity control variable potentiometer 11 and the coil 13 and the resistor 12 through the diode 9 and resistor 7 completing the circuit through the resistor 6.

During the downfeed condition, when the voltage across the condenser 5 exceeds the voltage across the condenser 18, a charging current will flow through the resistor 29 and through the condenser 28 to the control electrode or base of the second electronic control device or transistor 26 so as to cause transistor 26 to become conductive. In addition, a voltage will also be developed across the condenser 10 during a prolonged downfeed condition. The transistor 26 will conduct through the diode 27 to reduce the voltage, and thereby the velocity, which can be presented to the output coil 13. This clamping action will only develop while the condenser 28 is charging which occurs during a polarity reversal servomechanism hunt condition. During the steady state downfeed condition, the condenser 28 will become fully charged, and consequently the transistor 26 will no longer conduct and the high velocity condition will resume.

When the downfeed overshoots, the voltage between the condenser 5 and the condenser 18 will reverse, and the charge stored up on the condenser 28 will assist in turning ON the first electronic control device or complementary transistor 24 which will conduct through the diode 25 to consequently lower the servomechanism output back-up voltage. In order to prevent an excess dwell flow back-up condition from occuring, the charge stored on the condenser 10 during a downfeed condition is utilized for a momentary high velocity stopping and reversal. It should be noted, however, that this storage is not required in order to resume downfeed.

The diodes 25 and 27 prevent the application of reverse voltage to the base-collector elements of the complementary transistors 24 and 26, respectively. The diodes 25 and 27 and the complementary transistors with which they are associated operate to protect each other.

The resistor 29 and the condenser 28 provide a suitable resistance-capacitance time constant in order to feed the capacitance value of condenser 28 realistic as well as to limit the base current of the complementary transistors 24 and 26.

During normal cutting operations when substantially mild voltage variations may occur, the servomechanism circuit will be maintained in the stable low velocity condition. During any steady state condition, such as a prolonged downfeed or back-up, or a stalled quill, the system will revert to a high velocity condition. However, it should be carefully noted that the velocity control variable potentiometer 11 is still effective to set maximum desired high velocity.

In a preferred embodiment of the present invention, it should be noted that the use of the complementary transistors 24 and 26 render a substantially simplified circuit. Another novel aspect of the invention resides in the use of the stored charge on the capacitor 10 in one polarity to give a limited back-up surge on downfeed crash into the conductive workpiece 34.

In contrast to conventional servomechanism feed systems, in the present invention the output electrohydraulic coil 13 is not balanced between an input error signal voltage and a rigid reference voltage. Rather, the downfeed is in response to the input signal voltage, and at low velocities the system stabilizes near or at the desired arc gap condition. Moreover, the back-up voltage is "transistor triggered" only after a high velocity overshoot of the reference signal. At this time, the complementary transistors 24 and 26 shunting the output become conductive to reduce the velocity and give a stable operation.

It should be noted that the diodes 25 and 27 are complementary diodes which protect each other and serve to control which of the complementary transistors 24 or 26 will be turned ON.

An important aspect of the invention resides in the fact that the velocity or voltage across output coil 13 is continuously self-adjusting and variable in response to the degree of instability. The greater the instability, then the greater the damping effect or tendency to restore stability. This feature of the invention should not be confused with dual velocity control by other servomechanism feed systems.

I claim:

1. A servomechanism feed system comprising, in combination:

a source of electrical power;

a first movable means;

input signal means operatively connected to said first movable means for providing an electrical input signal representative of a condition in the vicinity of said first movable means;

motive means operatively connected to said first movable means for selectively moving said first movable means;

an electrically energized element operatively connected to and controlling the operation of said motive means;

velocity control means operatively connected to and controlling the operation of said electrically energized element;

variable reference signal means operatively connected between said source of electrical power and said velocity control means for providing a variable reference signal; and electrical means operatively connected to said input signal means, to said velocity control means, and to said variable reference signal means for providing a back-up signal for said electrically energized element only after a high velocity overshoot of said variable reference signal.

2. The combination according to claim 1 for use in an electrical discharge machining apparatus, wherein:

said first movable means is a tool electrode in said electrical discharge machining apparatus;

said input signal means is operatively connected to said electrode tool for providing an electrical input signal representative of arc gap voltage between said electrode tool and the conductive workpiece being operated on by said electrical discharge machining apparatus;

said velocity control means includes a variable potentiometer;

and said variable reference signal means includes a variable potentiometer.

3. The combination according to claim 1, including a pair of complementary first and second electronic control devices each of which has a control electrode and two power electrodes, the control electrodes of said electronic control devices being connected together, and one power electrode of each of said electronic control devices being connected to a common terminal of said electrically energized element and said velocity control means.

4. The combination according to claim 3, wherein said electrical means includes a third electronic control device having a control electrode and two power electrodes;

first impedance means connected between one terminal of said input signal means and said control electrode of said third electronic control device;

second impedance means connected between said variable reference signal means and one of said power electrodes of said third electronic control device;

the other terminal of said input signal means being connected to one terminal of said source of electric power;

a first parallel resistance-capacitance network having one of its terminals connected to said one terminal of said source of electrical power;

a first electrical component connected between said other power electrode of said third electronic control device and the other terminal of said first parallel resistance-capacitance network;

said electrical component having a substantially low impedance to the flow of electrons in a predetermined direction and having a substantially high impedance to the flow of electrons in a direction opposite to said predetermined direction.

5. The combination according to claim 4, wherein said electrical means includes a fourth electronic control device having a control electrode two power electrodes and a network connected between the control electrode of said fourth electronic control device and the control electrode of said pair of complementary first and second electronic control devices;

said variable reference signal means including a variable potentiometer; and one of the power electrodes of said fourth electronic control device being connected to the movable element of said variable potentiometer of said variable reference signal means.

6. The combination according to claim 5, wherein said network connected between the control electrode of the fourth electronic control device and the control electrode of the first and second electronic control devices includes:

a series arrangement of a resistor and a capacitor connected between said other terminal of said first parallel resistance-capacitance network and the control electrode of said pair of complementary first and second electronic control devices;

and a series arrangement of a resistor and a diode connected between said other terminal of said first parallel resistance-capacitance network and said control electrode of said fourth electronic control device.

7. The combination according to claim 1, wherein:

said electrically energized element comprises a coil;

said velocity control means includes a variable potentiometer and a first resistor which is connected between the movable element of said variable potentiometer and one terminal of said coil;

said other terminal of said coil being connected to a terminal of said variable potentiometer.

8. The combination according to claim 7, including:

a second parallel resistance-capacitance network having one of its terminals connected to said one terminal of said source of electrical power;

the other terminal of said second parallel resistance-capacitance network being operatively connected to said terminal of said variable potentiometer of said velocity control means;

The other terminal of said variable potentiometer of said vlocity control means being connected to a parallel network including a resistor, a diode and a capacitor;

third impedance means operatively connected between the other terminal of said last-mentioned parallel network and said other terminal of said first parallel resistance-capacitance network.

9. The combination according to claim 8, including:

a pair of complementary diodes connected between said other terminal of said last-mentioned parallel network and the other power electrode of said pair of complementary first and second electronic control devices, respectively.

10. The combination according to claim 1, wherein said electrical means includes first and second electronic control devices each of which has a control electrode and two power electrodes, the control electrodes of said electronic control devices being connected together, and impedance means connected between said control electrodes and said electrically energized element, said impedance means providing a transient response in output voltage signal applied to said electrically energized element.

* * * * *